United States Patent
Dahl et al.

(10) Patent No.: US 10,459,579 B2
(45) Date of Patent: Oct. 29, 2019

(54) TOUCHLESS INTERACTION

(75) Inventors: Tobias Gulden Dahl, Oslo (NO); Cato Syversrud, Oslo (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 428 days.

(21) Appl. No.: 14/125,908

(22) PCT Filed: Jun. 12, 2012

(86) PCT No.: PCT/GB2012/051325
§ 371 (c)(1),
(2), (4) Date: Feb. 4, 2014

(87) PCT Pub. No.: WO2012/172322
PCT Pub. Date: Dec. 20, 2012

(65) Prior Publication Data
US 2014/0176467 A1 Jun. 26, 2014

(30) Foreign Application Priority Data

Jun. 13, 2011 (GB) .................................. 1109865.4
Jul. 11, 2011 (GB) .................................. 1111774.4

(51) Int. Cl.
*G06F 3/043* (2006.01)
*G06F 1/3234* (2019.01)
*G06F 3/01* (2006.01)

(52) U.S. Cl.
CPC .......... *G06F 3/0433* (2013.01); *G06F 1/3259* (2013.01); *G06F 3/011* (2013.01);
(Continued)

(58) Field of Classification Search
CPC ...... G06F 3/043; G06F 1/1694; G06F 1/1692; G06F 3/017
See application file for complete search history.

(56) References Cited

U.S. PATENT DOCUMENTS 6,542,436 B1    4/2003  Myllyla
8,086,971 B2 * 12/2011  Radivojevic et al. ........ 715/863
(Continued)

FOREIGN PATENT DOCUMENTS

EP         2 204 640       7/2010
WO   WO 2009/115799       9/2009
(Continued)

OTHER PUBLICATIONS

International Search Report dated Jan. 4, 2013 from International Application No. PCT/GB2012/051325.
(Continued)

*Primary Examiner* — William Lu
(74) *Attorney, Agent, or Firm* — Beyer Law Group LLP

(57) ABSTRACT

A portable electronic device comprises means 4 for transmitting ultrasonic signals 8, means 6 for receiving ultrasonic signals 12 reflected from an input object 10, and means for processing received ultrasonic signals to determine an input to the device. The device is configured to reduce the transmission power of the ultrasonic signals transmitted by the transmitting means in the event that: the device determines that a reflection 16 from an object 14 other than the input object meets a predetermined criterion; or if an event is detected which indicates that the user is or will be using a function of the device which does not support touchless interaction.

Also disclosed is an electronic device comprising transmission means 4 for transmitting ultrasonic signals 8, means 6 for receiving ultrasonic signals 12 reflected from an input object 10 and means for processing received ultrasonic signals to determine an input to the device, the device further comprising user operable control means for allowing a user to turn a touchless interaction mode on and off, the device
(Continued)

being configured to execute an additional operation when the touchless interaction mode is turned off.

9 Claims, 4 Drawing Sheets

(52) U.S. Cl.
CPC .............. *G06F 3/017* (2013.01); *G06F 3/043* (2013.01); *G06F 2203/04108* (2013.01); *Y02D 10/155* (2018.01)

(56) References Cited

U.S. PATENT DOCUMENTS

| | | | |
|---|---|---|---|
| 8,848,486 B1 * | 9/2014 | Elwell | 367/117 |
| 8,970,487 B2 * | 3/2015 | Leyvand et al. | 345/156 |
| 2005/0248540 A1 | 11/2005 | Newton | |
| 2006/0153391 A1 * | 7/2006 | Hooley et al. | 381/17 |
| 2007/0288194 A1 * | 12/2007 | Boillot | 702/150 |
| 2008/0048878 A1 * | 2/2008 | Boillot | 340/686.1 |
| 2008/0055247 A1 * | 3/2008 | Boillot | 345/158 |
| 2008/0100572 A1 | 5/2008 | Boillot | |
| 2008/0259053 A1 * | 10/2008 | Newton | 345/175 |
| 2009/0139778 A1 * | 6/2009 | Butler et al. | 178/18.03 |
| 2009/0197615 A1 | 8/2009 | Kim et al. | |
| 2010/0181988 A1 * | 7/2010 | Hong et al. | 323/318 |
| 2011/0003614 A1 * | 1/2011 | Langereis et al. | 455/550.1 |
| 2011/0077757 A1 * | 3/2011 | Chang et al. | 700/94 |
| 2011/0163976 A1 * | 7/2011 | Barnhoefer et al. | 345/173 |
| 2012/0001875 A1 * | 1/2012 | Li et al. | 345/177 |
| 2012/0243374 A1 * | 9/2012 | Dahl et al. | 367/93 |
| 2013/0114380 A1 * | 5/2013 | Bryger et al. | 367/199 |
| 2013/0301391 A1 * | 11/2013 | Altman et al. | 367/100 |

FOREIGN PATENT DOCUMENTS

| | | |
|---|---|---|
| WO | WO 2011/004135 | 1/2011 |
| WO | WO 2011/036486 | 3/2011 |

OTHER PUBLICATIONS

Written Opinion dated Jan. 4, 2013 from International Application No. PCT/GB2012/051325.

* cited by examiner

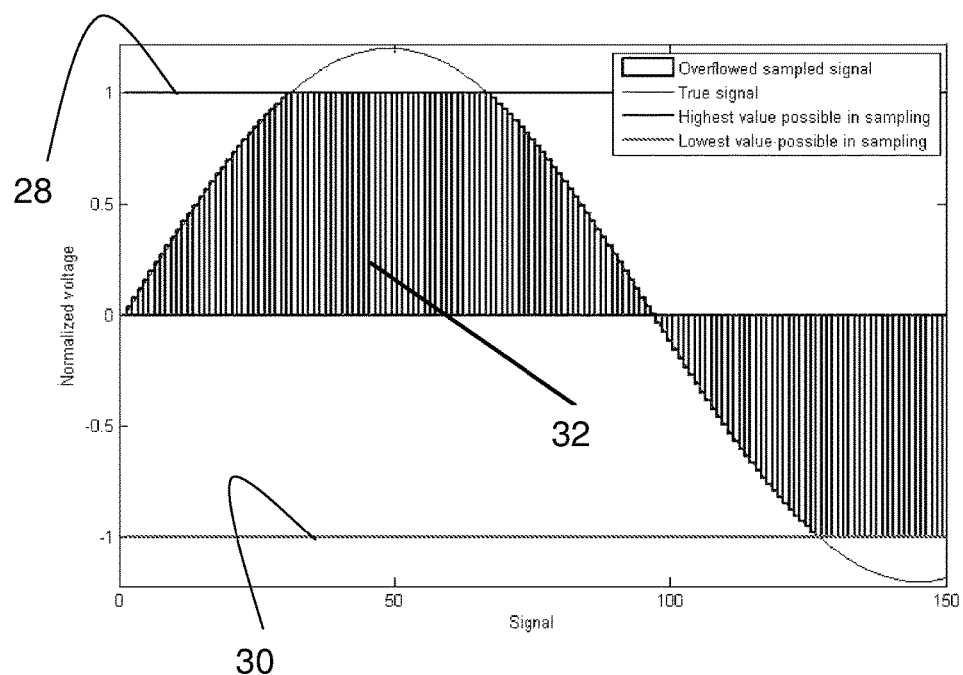
FIG 4
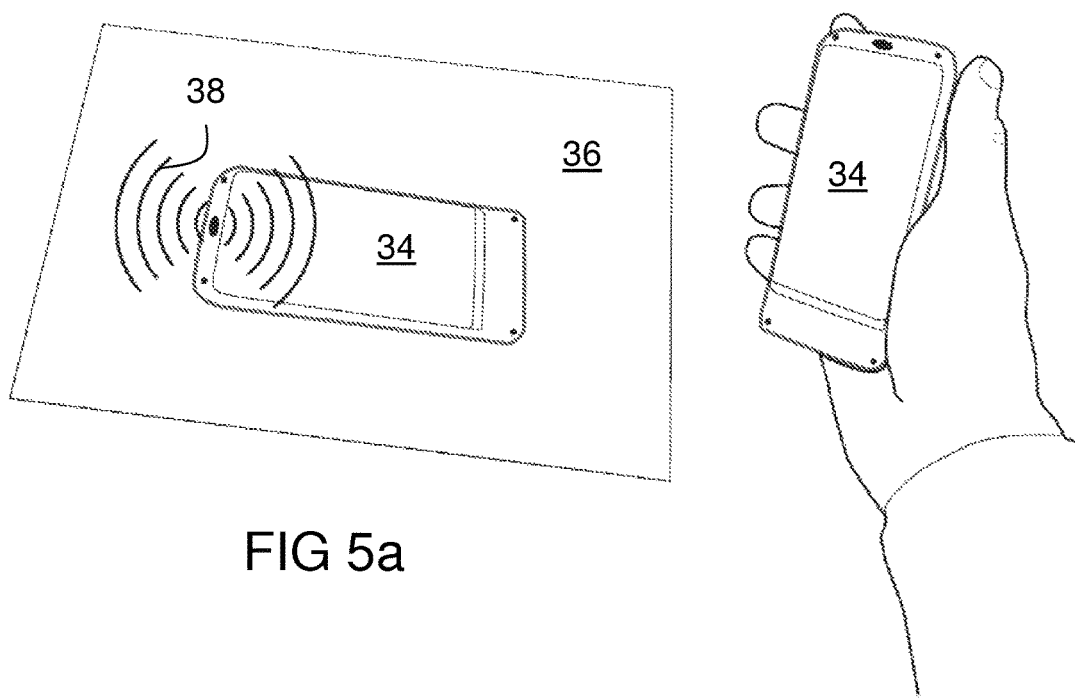
FIG 5a
FIG 5b

TOUCHLESS INTERACTION

This invention relates to electronic devices which permit a user to interact with the device in a touchless manner It relates particularly, to hand-held devices employing ultrasound for touchless interaction.

There have been several proposals in recent years by the present Applicant and others for using reflections of ultrasonic signals from a user's finger or hand to give an input to a hand-held mobile device such as a smart-phone. However, the Applicant has now recognised a drawback in using ultrasonic touchless technology in such applications which is that if the user holds the device near their head, this is likely to act as a much stronger reflector of the ultrasonic signals than the finger or hand which could either lead to significant distortion of the desired signal or simply spurious unintended inputs to the device. This is particularly the case when a user seeks to use the device as a phone since this usually involves holding the device close to their ear.

When viewed from a first aspect the present invention provides a portable electronic device comprising means for transmitting ultrasonic signals, means for receiving ultrasonic signals reflected from an input object, and means for processing received ultrasonic signals to determine an input to the device, wherein the device is configured to reduce the transmission power of the ultrasonic signals transmitted by the transmitting means in the event that the device determines that a reflection from an object other than the input object meets a predetermined criterion.

Thus it will be seen by those skilled in the art that in accordance with the invention, the portable electronic device is able to determine the presence of an object other than the input object. In a set of preferred embodiments this other object is part of the user's body e.g. their head. For example if the presence of the user's head is detected close to the device, it may indicate that the user is making a call or is about to, and therefore reducing the power of the transmission is beneficial to save battery life since it may then be assumed that the user does not currently wish to interact touchlessly with the device. Similarly if the device is placed in the user's pocket or bag, it is desirable to reduce transmission power.

In general the other object is larger than the input object.

The transmission power could be reduced to a lower fixed value, reduced by a fixed amount, reduced by an amount dependent upon the signal received from the other object or any combination of these. Alternatively transmission could simply be stopped. Thus all references hereinto reducing power should be considered to include complete cessation.

The criterion for reducing power based on signals from the other object could take one of a number of forms or any combination thereof. In a set of embodiments the criterion comprises determining a difference metric between two temporally-separated received signals and reducing transmission power if the difference between the signals is below a threshold. A high level of similarity between received signals can be taken to indicate that the object in front of the device is not moving or moving only slowly. This is likely to be true if the user places the device near to his head or in a pocket, but not if he is moving his finger or hand in front of the device in order to interact with it.

The aforementioned difference metric could comprise just two signals or more than two. The signals need to be consecutive - they could be spaced in time. The difference metric could involve raw received signals or signals processed in some way—e.g. impulse responses.

In another set of embodiments the criterion comprises whether a level of the received signal exceeds a threshold. For example reflection of the transmitted signal by an object which is larger than the intended input object and/or is very close will give signals of a higher level. There are a number of ways in which such a criterion could be applied. One possibility would be to compare the amplitude of the raw received signal with a threshold. Another possibility would be to compute impulse responses from the received signals and to apply a threshold impulse response criterion for determining whether to reduce the transmission power. A further possibility would be to calculate the total reflected energy received over a given period and apply a threshold criterion to said total reflected energy received.

In another set of embodiments the level of the received signal may be determined to be above the threshold indirectly by means of saturation being detected in one or more parts of the received signal path, e.g. the receiver signal transducer itself, an amplifier or an analogue-to-digital converter. Thus in a set of embodiments the device comprises means for determining that the received signal has resulted in an overload condition occurring in the means for processing the received signals.

The Applicant has appreciated that reducing the transmission power in a touchless interaction-enabled device if the level of the received signal is too high is beneficial more generally and thus when viewed from a second aspect the invention provides a portable electronic device comprising: means for transmitting ultrasonic signals, means for receiving ultrasonic signals reflected from an input object, and means for processing received ultrasonic signals to determine an input to the device, wherein the device is configured to reduce the transmission power of the ultrasonic signals transmitted by the transmitting means in the event that the means for processing the received signals determines that a level of the received signal exceeds a threshold.

As before the level of the signal could be the amplitude of the raw signal, energy of the signal, value of an impulse response calculated from the signal or any other suitable level associated with the signal. Alternatively, again as before, the device could determine that the signal level has exceeded the threshold by an overload condition being met in the means for processing received signals.

Again, as before, the overload condition could comprise saturation of an input transducer—that is to say receipt by the transducer of a signal outside its dynamic range. Equally the overload condition could comprise saturation or overflow occurring in an analogue to digital converter, or any other part of the means for processing received signals.

In addition to reducing transmission power in the presence of an object other than the input object, the Applicant has appreciated that it may also be beneficial to do so upon detection of an event indicative that the user is using a function of the device which does not support touchless interaction. For example where the device comprises a cellular phone, the transmission power may be reduced when it is determined that the device is being used to make or receive a call. Such an arrangement is considered to be novel and inventive in its own right and thus when viewed from a yet further aspect the invention provides a portable electronic device comprising means for transmitting ultrasonic signals, means for receiving ultrasonic signals reflected from an input object and means for processing received ultrasonic signals to determine an input to the device, wherein the device is configured to reduce the transmission power of the ultrasonic signals transmitted by the transmitting means if an event is detected which indicates that the user is or will be using a function of the device which does not support touchless interaction.

In a set of embodiments the above-mentioned event which is detected is simply the selection by a user of a mode or function which does not support touchless interaction, for example the user initiating a voice call. In another set of embodiments the event may be triggered automatically by an operation of the device—e.g. receipt of an external call. In another set of embodiments the event may comprise the movement or orientation of the device—for example if the device is moved rapidly to a near-vertical orientation it might be detected that the user is holding the device to their ear.

The event which is detected need not be a single point in time, it could be a compound set of criteria which might involve any or all of the conditions above and any others—e.g. a time criterion.

This idea can be extended such that signals are only transmitted while required for a particular touchless interaction mode and furthermore that the end of a period of touchless interaction can be used to provide an input to a device. Thus when viewed from a further aspect the invention provides an electronic device comprising transmission means for transmitting ultrasonic signals, means for receiving ultrasonic signals reflected from an input object and means for processing received ultrasonic signals to determine an input to the device, the device further comprising user operable control means for allowing a user to turn a touchless interaction mode on and off, the device being configured to execute an additional operation when the touchless interaction mode is turned off.

Thus it will be seen by those skilled in the art that in accordance with this aspect of the invention the user has direct control over when the touchless interaction mode is on or off. The additional operation associated with turning the touchless interaction mode off conveniently allows the device to take advantage of the positive indication from the user that the touchless movement is finished which is provided by the control means without requiring the user to give an additional input. In one example the touchless interaction mode may be used for highlighting a portion of a display such as a menu option or a portion of text, whilst the additional operation comprises actually selecting (i.e. enacting) the menu option or copying the highlighted text to a clipboard. This overcomes a difficulty appreciated by the Applicant in touchless interaction systems in being able to distinguish reliably between a movement intended to alter what is highlighted and a movement intended actually to operate on what is highlighted—such as confirming a menu selection as mentioned above. Of course this is just one example and many other alternatives additional operations are possible.

In one set of embodiments although the user-operable control means acts to switch the aforementioned touchless interaction mode on or off, this does not preclude a different interaction mode prevailing when the aforementioned touchless interaction mode is off. Taking again the example of text highlighting, when this mode is off the device could still be arranged to employ a touchless interaction mode to permit say scrolling.

In another set of embodiments the transmission means is powered or increased in power while said touchless interaction mode is on and powered off or decreased in power while said touchless interaction mode is off. This means that the transmitter need only be powered, or powered at a higher lever, when the user requires it. This allows for a significant reduction in power consumption compared to a device in which the transmission means is operated constantly. It also reduces the problem of potential interference with other devices as far as possible.

The reference to the operation being 'additional' is simply intended to mean that the operation is in addition to actually turning off or powering down the transmission means, or changing the touchless interaction mode back to the default or background one if provided.

The control means could be configured as a toggle or latching arrangement so that a positive interaction is required both to turn on and turn off the touchless interaction mode. In another set of embodiments the control means comprises a button which must be continuously pressed by the user in order to activate the touchless interaction mode. The button could be physical or virtual—e.g. provided on a touchscreen. Similarly the latch or toggle switch could be real or virtual.

In accordance with all aspects and embodiments of the invention, the recited reduction in transmission power could be a fixed amount, a fixed percentage or reduction to a fixed level (which could be zero). Equally a quantitative criterion or set of criteria may be applied so that the reduction in power is a function of the value associated with the criterion giving rise to the reduction—e.g. the amount by which a threshold is exceeded.

The power reduction could be effected in many different ways. For example it could be applied abruptly or progressively. It may be reduced in steps or in a continuously variable manner.

In one set of embodiments power reduction is achieved by reducing the peak signal strength of the transmitted signals. This could be effected by controlling the gain of an amplifier connected to a transmission transducer. Equally it could be effected by reducing the signal further upstream—either in the analogue or digital parts of transmitter.

In another (potentially overlapping) set of embodiments the reduction in power is effected by reducing the rate at which signals are transmitted. It will be appreciated that even if the peak power is maintained under such an arrangement, the average power will be reduced.

In accordance with all aspects and embodiments of the invention, the transmission power may also be reduced if it is determined that the input object is beyond a boundary which could be defined in terms of a threshold time of flight (giving rise to an ellipsoid boundary) or it may be any other shape. This is beneficial in conserving battery power when the input object is too far away to detect clearly. The boundary could be fixed or could be dynamically variable—e.g. taking into account the level of background noise, interfering reflections etc.

None of the sets of embodiments of any aspects of the invention set out herein should be considered mutually exclusive unless otherwise stated or unless the technical context dictates. Thus any features disclosed herein may be employed in any valid combination in any embodiment of any aspect of the invention.

The ultrasonic signals defined herein could comprise any suitable signal shape such as pulses, chirps, or more complex encoded signals. The frequency of the signals, or median frequency where the signals comprise a number of frequencies, is preferably greater than 20 KHz, more preferably greater than 30 KHz and may be as high as 50 or 100 KHz or even higher.

Certain embodiments of the invention will be described, by way of example only, with reference to the accompanying drawings in which:

FIG. 4 illustrates the application of a threshold to the amplitude of the voltage from the receiver chain;

FIGS. 5a and 5b show the effect of lifting a device from a table in one embodiment of the invention;

Figure 1A:
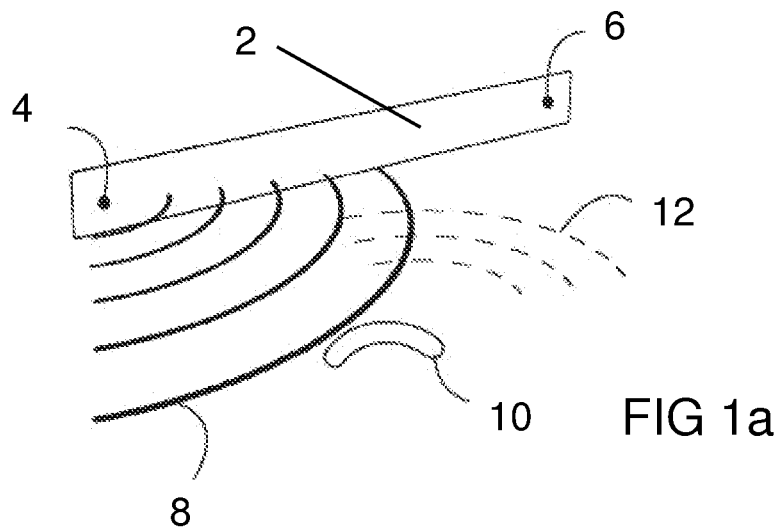
FIGS. 1a and 1b show respectively the reflections from an input object and a larger object.

FIG. 1a shows schematically the edge of a mobile device 2 comprising an ultrasonic transmitter 4 and an ultrasonic receiver 6. Only one of each is shown although in a typical implementation multiple transmitters and/or receivers would be provided. The device has a touchless interaction mode in which ultrasonic pulses 8 are reflected from an input object 10 (shown here schematically) such as a user's finger and the reflected echoes 12 are received at the receiver 6 and used to establish the position and/or movement of the finger 10 which is then used to control a function of the device 2. More details of ways in which this may be achieved are given in the Applicant's prior applications, e.g. WO 2009/115799 and WO 2011/004135.

Figure 1B:
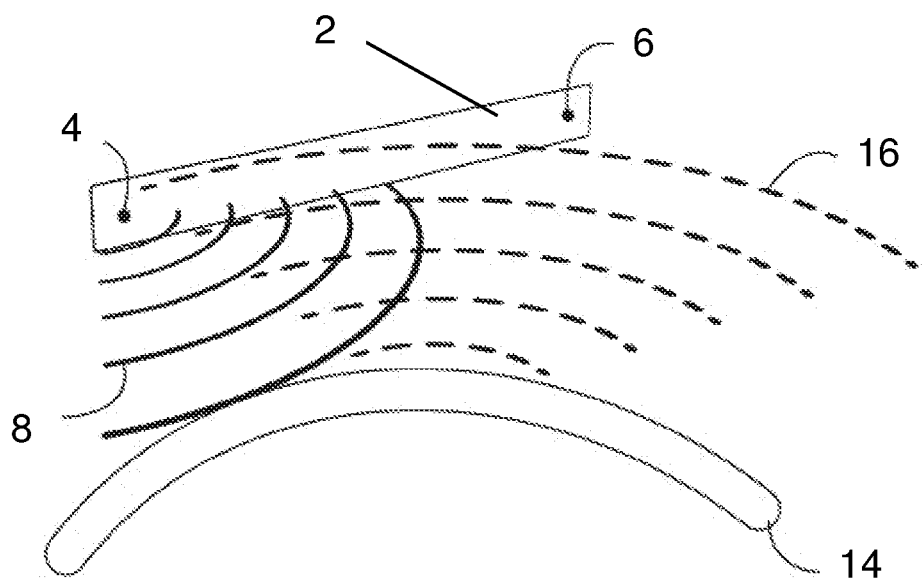

FIG. 1b demonstrates what happens when the same ultrasonic pulses 8 are reflected from another, larger object 14 such as a user's head or the side of a bag, at a similar distance from the device 2 as the finger 10 is shown in FIG. 1a. In this instance the reflected pulses 16 are much stronger than when reflected from the finger. In accordance with some of the embodiments of the invention described herein that increase in echo strength can be used to reduce the transmission power. This can both avoid problems in processing the signal but can also conserve battery power where the touchless interaction mode is not being used or cannot be used.

Figure 2:
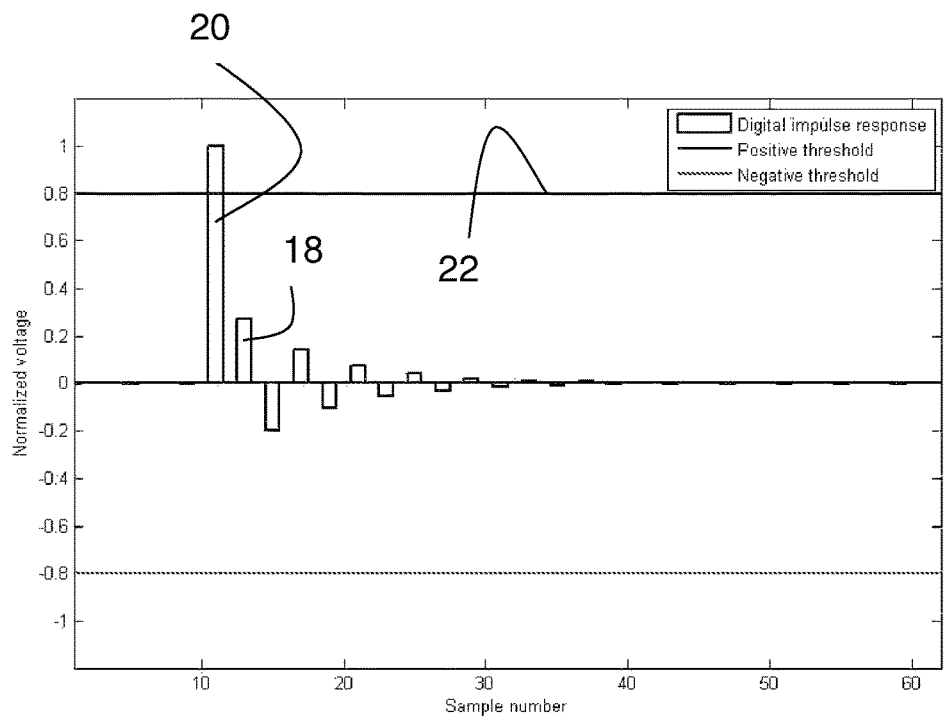
FIG. 2 illustrates the application of a threshold to the impulse response amplitude.

FIG. 2 shows a representative plot of the magnitude and sign of an impulse response calculated from the signals received at the ultrasonic receiver 6 in the arrangement shown in FIG. 1b. The larger plot 20 corresponds to the strong reflection 16 from say a head as shown in FIG. 1b, the smaller plots 18 corresponding e.g. to reverberations. A threshold 22 in the impulse response is defined, above which the transmitter 4 is either turned off or reduced in power. This provides a simple way of distinguishing between the situation in FIG. 1a where the touchless interaction mode is required and that in FIG. 1b where it is not needed—e.g. because a user has put the device to their ear or in a bag. In the former case (not shown) the threshold 22 is not normally exceeded by the impulse responses.

Figure 3:
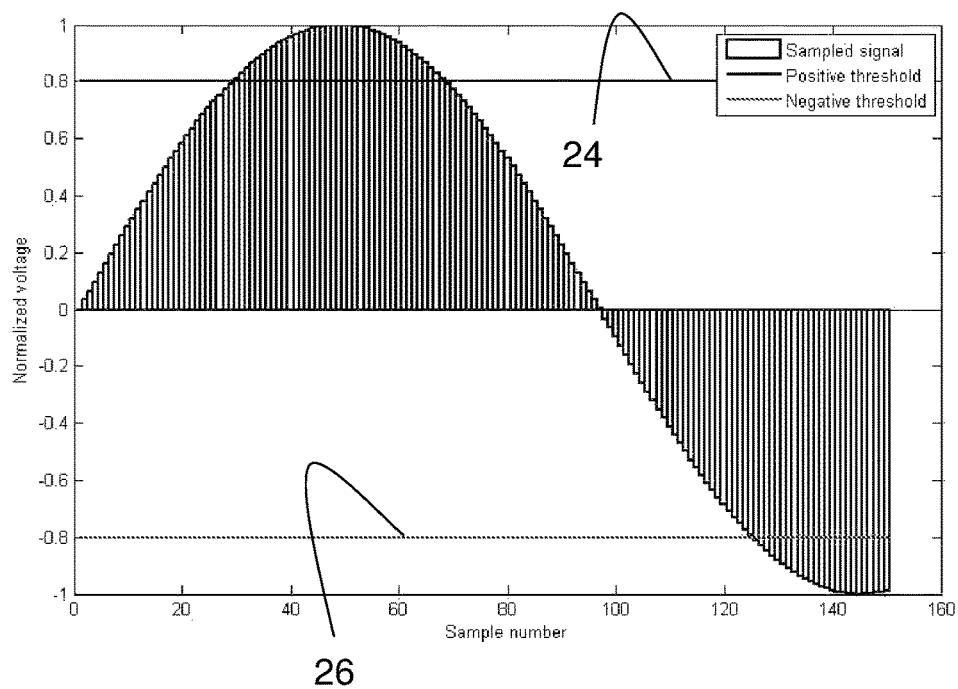
FIG. 3 illustrates the application of a threshold to the raw signal amplitude.

FIG. 3 illustrates an alternative criterion which may be applied to the reflected signals as a measure of an object larger than the intended input object. Here there may be seen plot of the amplitude of the raw received signal. Here again a thresholds 24, 26 may be applied to the positive and negative signs of the signal such that if a signal above the threshold is detected, this can be assumed to arise from a larger object and so transmissions be reduced or stopped.

FIG. 4 illustrates a criterion indicating a non-input object which involves considering components in the receiver chain such as the analogue-to-digital converter (ADC). The curve shows the actual received signal whilst the two horizontal lines 28, 30 indicate the highest and lowest values which may be sampled by the ADC. The shaded area 32 indicates the output of the ADC. By applying an algorithm that detects the artificially flattened parts of the output, the saturation of the ADC can be detected and so presence of a larger reflecting object inferred. Such an algorithm might look for a succession of maximum (or minimum) outputs from the ADC which do not match the original signal.

FIGS. 5a and 5b illustrate a different criterion which may be applied to reducing or stopping transmissions. In FIG. 5a a mobile device 34 is shown on a table 36 transmitting pulses 38 to operate a touchless interaction mode. However if the device 34 is picked up as shown in FIG. 5b, the pulses are stopped. This may be because the device is only designed to offer the touchless interaction mode when it is stationary to ensure the reliability of the detections it makes, or because it is assumed that a user is picking up the device to put it away or to answer a call. The pick-up detection could be based on a inclination of the device 34—e.g. by means of an internal gyroscopic sensor—or acceleration, or both.

Figure 6:
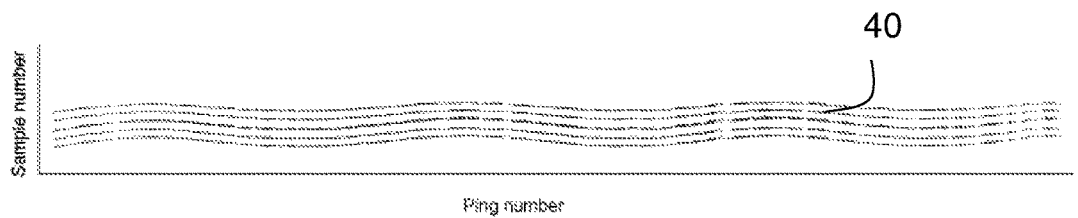
FIG. 6 shows an impulse response image which can be used to indicate a power reduction.

FIG. 6 illustrates another way in which it may be inferred that touchless interaction mode is no longer required. The Figure shows an impulse response image over time. It may be seen that the traces 40 vary very little in the vertical direction. This indicates that there is little or no movement of the reflecting object. This could be because the device has been placed in a bag or against an ear or simply that there is no input object (the traces 40 corresponding to reflections from background objects). It may therefore be inferred that the touchless interaction mode is no longer required and the transmissions reduced or stopped to conserve power.

Figures 7A, 7B:
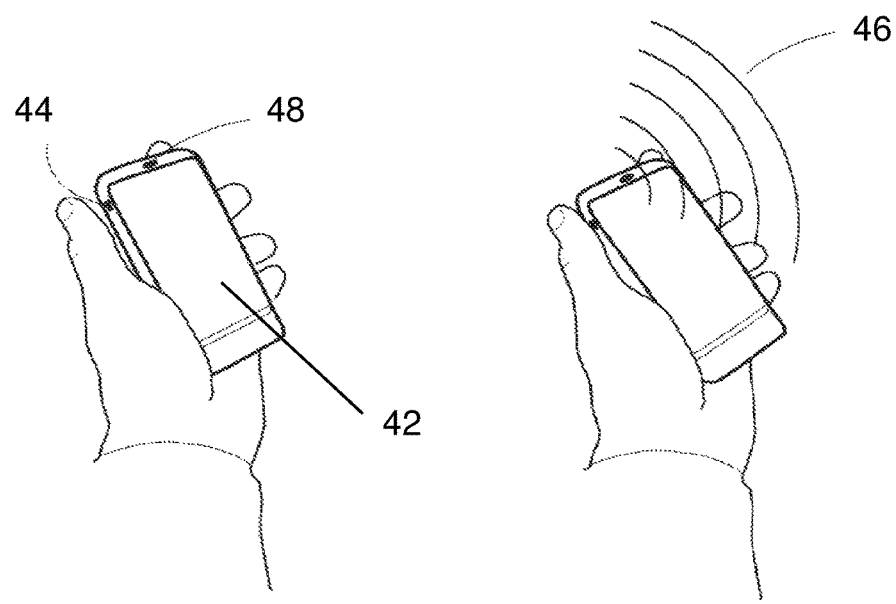
FIGS. 7a and 7b show an embodiment with a button to turn touchless sensing on and off.

FIGS. 7a and 7b show an embodiment of the invention in which a mobile device 42 has a push-button 44 which is used to activate a touchless interaction mode. Thus when the button 44 is pressed as shown in FIG. 7b. ultrasonic signals 46 are transmitted from the transmitter 48 and the reflections of these signals are used to determine the position and motion of an input object such as a user's finger (not shown). This allows for a very power-efficient arrangement in which the signals 46 are only transmitted when actually required (and accordingly the reflected signals need only be processed when required). Furthermore the ending of a touchless interaction may be used as a cue to perform an action. For example if the touchless interaction is used to select a menu option on the screen of the device 42, then ending the touchless interaction mode by releasing the button 44 could be interpreted to activate the selected menu option.

Of course it will be appreciated that the button 44 could be a toggle rather than a momentary push-to-operate button and/or could be a virtual button on the touch-screen rather than a physical button.

It will be appreciated by those skilled in the art that only a few specific examples of possible embodiments of the invention have been described and many more are possible within the scope of the invention. Moreover those described, as well as others, may be combined in any desired way in a particular application such that the reduction in power may be triggered by one of a plurality of criteria, or such that a plurality of criteria must be met to trigger it. Reinstatement of transmissions or an increase in power may be triggered automatically—by reversal of the condition triggering the reduction or another algorithm—or may require positive action by a user.

The invention claimed is:

1. A portable electronic device comprising:
   a transmitter configured to transmit ultrasonic signals at a first transmission power,
   a receiver for receiving ultrasonic signals reflected from an input object, and a processor for processing received ultrasonic signals to determine an input to the device, wherein the device is configured to continue transmitting ultrasonic signals at a second, lower, transmission power in the event that the device determines that a reflection from an object other than the input object meets a predetermined criterion.

2. The device as claimed in claim 1 wherein the other object is part of a user's body.

3. The device as claimed in claim 1 wherein said predetermined criterion comprises determining a difference metric between two temporally-separated received signals and the device is configured to transmit said ultrasonic signals at said second transmission power if the difference between the signals is below a threshold.

4. The device as claimed in claim 1 wherein said predetermined criterion comprises whether a level of the received signal exceeds a threshold.

5. The device as claimed in claim 1 configured to determine that the received signal has resulted in an overload condition occurring in the processor.

6. The device as claimed in claim 1 configured to transmit said ultrasonic signals at said second transmission power upon detection of an event indicative that the user is using a function of the device which does not support touchless interaction.

7. The device as claimed in claim 1 wherein said ultrasonic signals transmitted at said second transmission power have a lower peak signal strength than said ultrasonic signals transmitted at said first transmission power.

8. The device as claimed in claim 1 wherein said ultrasonic signals transmitted at said second transmission power have a lower transmission rate than said ultrasonic signals transmitted at said first transmission power.

9. The device as claimed in claim 1 configured to transmit said ultrasonic signals at said second transmission power if it is determined that the input object is beyond a boundary.

* * * * *